Oct. 25, 1960 W. NESSELBERGER 2,957,549
DEVICE FOR PREVENTING ROLLING OF VEHICLES AND THE LIKE
Filed March 1, 1957 3 Sheets-Sheet 1

INVENTOR
WALTER NESSELBERGER

Oct. 25, 1960     W. NESSELBERGER     2,957,549
DEVICE FOR PREVENTING ROLLING OF VEHICLES AND THE LIKE
Filed March 1, 1957                   3 Sheets-Sheet 3

INVENTOR
WALTER NESSELBERGER

United States Patent Office 2,957,549
Patented Oct. 25, 1960

2,957,549

DEVICE FOR PREVENTING ROLLING OF VEHICLES AND THE LIKE

Walter Nesselberger, Hirtenstr. 11, Wiesbaden-Sonnenberg, Germany

Filed Mar. 1, 1957, Ser. No. 643,324

2 Claims. (Cl. 188—4)

The present invention relates to means for preventing forward rolling and backward moving of vehicles during stoppage or parking thereof.

Known devices of this type generally include wedge means or the like which are placed between a wheel of the vehicle and the surface carrying the vehicle in order to prevent rolling thereof. However, all known devices for preventing rolling of the vehicle do not operate easily and quickly enough and do not reliably prevent rolling of a vehicle under all conditions.

It is one of the objects of the present invention to provide means conducive to effective prevention of rolling of the halted or parked vehicle in a very reliable manner.

Another object of the present invention is to provide means facilitating forcibly and positively guiding and placing a brake or stopping block in an operative position in which said block engages a wheel of a vehicle and the surface which carries the vehicle.

Still a further object of the present invention resides in the provision of means redounding to a very effective stop-block structure which fulfills all the requirements of the modern motor vehicle drive technique, may be readily installed in existing trailer, tractor and like vehicles and may be conveniently operated by electro-pneumatic valve means from the vehicle dashboard.

An additional object of the present invention is to provide means affording automatic, quick and easy return movement of a stopping block of the aforesaid type to its rest position away from a wheel of the vehicle and the road or other surface in engagement with and carrying said vehicle.

It is also an object of the present invention to provide means contributing to a relatively simple, efficacious and rigid vehicle block structure which is inexpensive to manufacture and is easy to replace.

These and other objects of the invention will become further apparent from the following detailed description, reference being made to the accompanying drawings, showing preferred embodiments of the invention.

Figure 1:
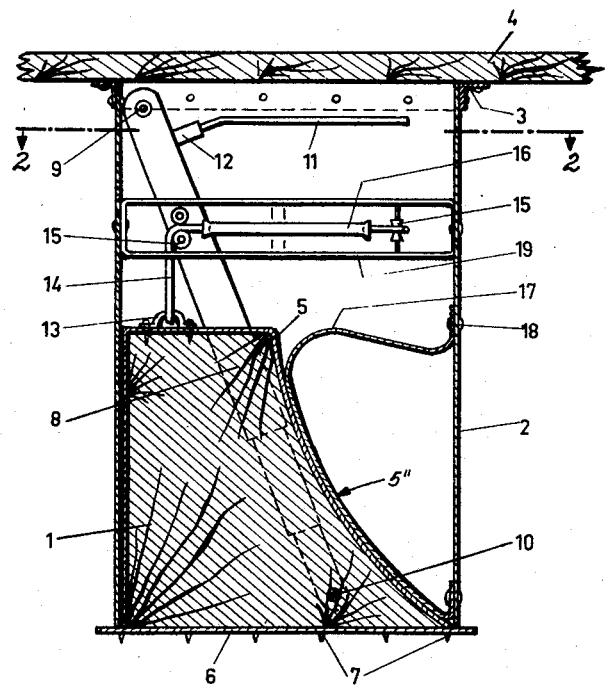
Fig. 1 is a schematic elevational view in section of one of many possible embodiments of a block operating device according to the present invention.

Referring now to Fig. 1 of the drawings, it will be seen that the block 1 is illustrated in its rest position where it is located within a housing 2 which forms part of a support means of the device of the invention. This support means includes the part 4 of the vehicle together with the housing 2 and the angle irons 3 fixed to the vehicle part 4 and the housing 2 for connecting the latter to the vehicle part 4. This vehicle part 4 may be, for example, a load carrying part of a vehicle.

The block 1 has a sheet steel casing 5 forming the outer faces thereof, which includes a bottom wall 6 which has pointed projections 7 fixed thereto and extending downwardly therefrom. The casing 5 is formed of suitable sheets of steel which are welded or otherwise fixed to the other portions of the block 1. It will be noted from Fig. 1 that in the rest position of the block 1 the bottom wall 6 of the block closes the bottom opening of the housing 2 and extends beyond the housing 2. In this way the interior of the housing 2 is protected from dirt and other foreign matter while the block is in its rest position. It is to be noted that the side wall 5" of the block 1 is concavely arcuate in shape and the block is wider at the bottom than at the top thereof.

A hollow, expansible and collapsible telescopic means is connected to the housing 2 and to the block 1 for moving the latter to its operating position during the expanding of the telescopic means and for guiding the block to its rest position during collapsing of the telescopic means. This telescopic means includes a pair of elongated telescoped tubular members 8.

Figure 3:
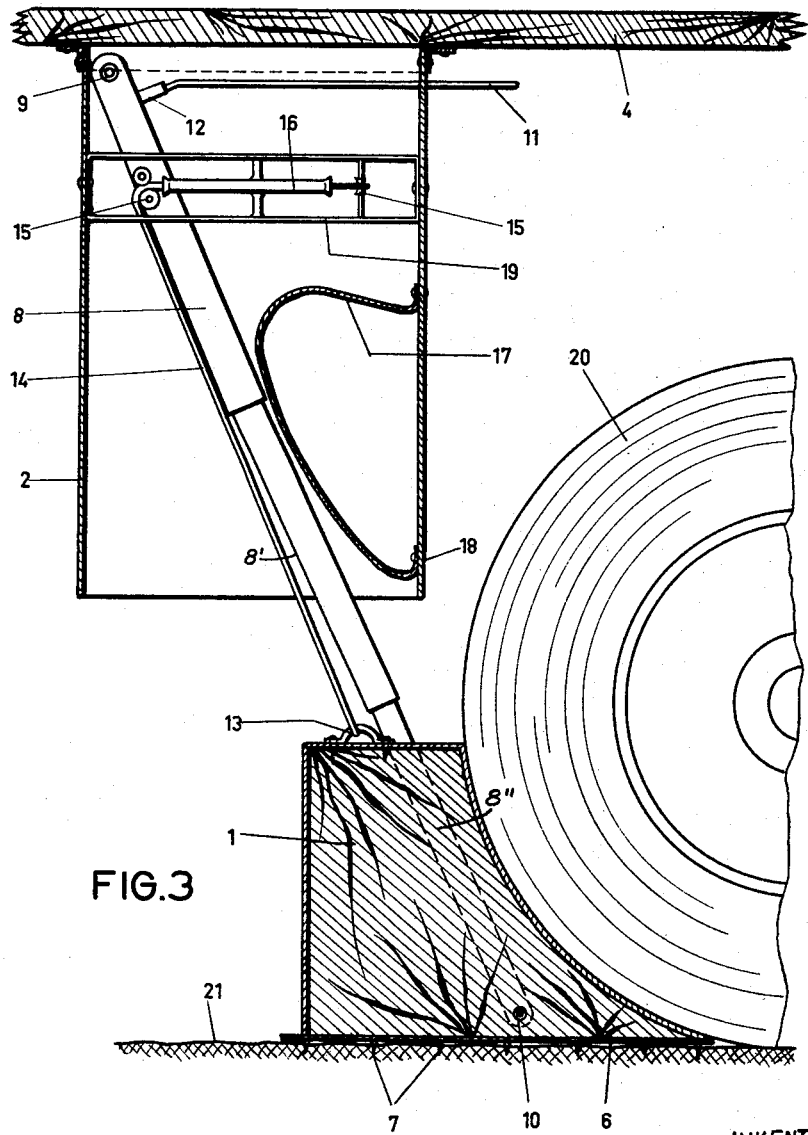
Fig. 3 is an enlarged sectional elevational view of the device of Fig. 1 transformed and moved to its operative position.

The upper end of each set of members 8 is fixed at 9 to a wall of the housing 2, as indicated in Figs. 1 and 3. The sets of telescopic members 8 are respectively located on opposite sides of the block 1. At its lower end each set of telescoped members 8 is pivotally connected at 10 to the block 1.

Figure 4:
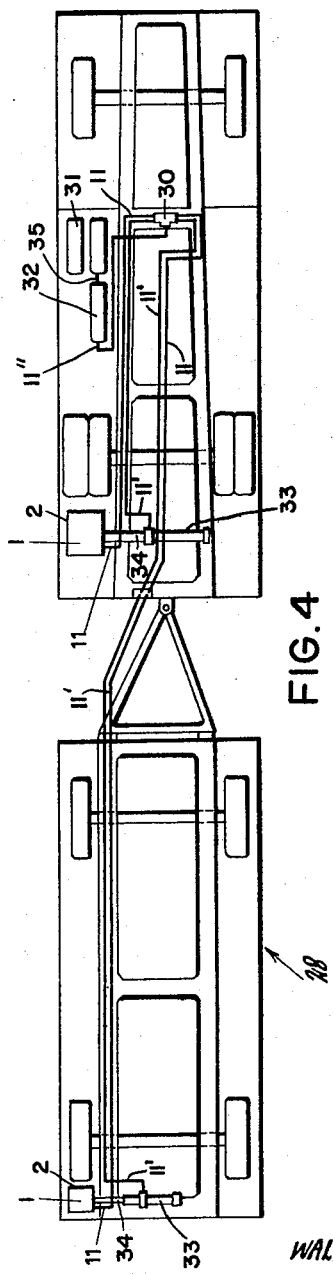
Fig. 4 schematically illustrates the pneumatic arrangement of the invention as applied to a lead vehicle and a trailer.

A conduit means communicates with the interior of each of the telescopic means for supplying fluid under pressure thereto for expanding the telescopic means so as to move the block from its rest to its operating position. This conduit means is shown in Figs. 1 and 3 as including the conduit 11 for fluid under pressure, this conduit 11 being connected to any suitable source of fluid, such as air or the like under pressure. Fig. 4 shows a compressed air tank 32. A fitting 12 serves to connect the conduit 11 with branch conduits leading to the interior of the pair of telescopic means 8, respectively. The conduit 11 has control valves of the device connected thereto, and these valves are operated from the dash-board of the vehicle.

As is shown in Figs. 1 and 3, an eye 13 is fixed to the top of the block 1 and serves to connect thereto a pull cable 14 used to return the block to its rest position. The cable is guided over rollers 15 and through a tubular guide 16 to a cylinder operated by air under pressure, so that a piston in such a cylinder may be connected to the cable for moving the latter when the piston moves in the cylinder, for example. Such a cylinder 33 is diagrammatically shown in Fig. 4.

A resilient strip 17 is carried by the support means 2—4 for resiliently retaining the block in its rest position. As is apparent from Figs. 1 and 3, this resilient strip 17 is connected to the housing 2 by the rivets 18. When the block 1 is in its rest position shown in Fig. 1 the resilient strip 17 will press against the arcuate side wall 5" of block 1 so as to maintain the latter in its rest position. This is possible due to the fact that the block moves at an angle but in a substantially straight path upwardly into engagement with the resilient strip 17.

Figure 2:
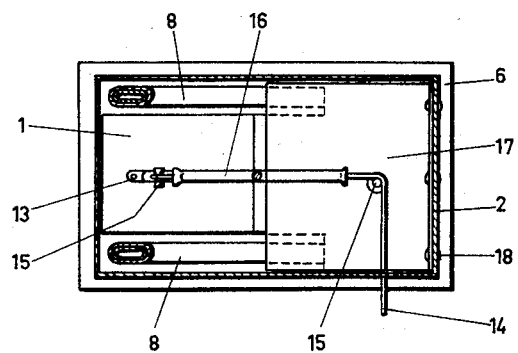
Fig. 2 is a sectional plan view taken along the line 2—2 of Fig. 1 as seen in the direction of the arrows.

The rollers 15 as well as the guide 16 are carried by a suitable supporting frame 19 which is in turn carried by the housing 2 in the interior thereof. The housing 19 has been omitted from Fig. 2 for the sake of simplicity and clarity.

In Fig. 3 the block 1 is shown in its operating position between and in engagement with the wheel 20 of a vehicle and the surface 21 which carries the vehicle, and it will be noted that the pointed projections 7 of the bottom wall 6 provide a high frictional contact between the block and the surface 21 so as to reliably prevent slipping of the block with respect to the surface 21.

It is apparent that when a fluid such as air under pressure is introduced into the hollow telescopic means 8 while the block is in its rest position, the telescopic means will expand so as to move the block from its rest to its operative position illustrated in Fig. 3. Pulling on the pull cable 14 returns the block to its rest position.

Of course, the device of the invention may be used with either a front or a rear wheel of a vehicle.

It will be noted that the resilient strip 17 engages the surface of the block which engages the wheel of the vehicle, so that this resilient strip 17 also serves to cover an empty and hollow space in the housing 2. Because the strip 17 is resilient, it is possible to move the block 1 to its rest position in the housing 2 even if the surface of the block which engages the strip 17 is covered with dirt.

The sets of telescopic members are each preferably designed so as to be capable of expanding to three times their collapsed length.

The block 1 is actuated upon release of a valve 30 of any suitable type, causing air from the air cylinder 33 to escape through conduits 11. The block 1 is being held in a raised position by spring strip 17. At the same time the valve permits fluid from tank 32 to push through conduits 11″ to both of the hollow telescopic members 8, which press the block 1 out of the housing 2, downward into operative position. The pneumatic action presses the block tightly against the ground. A shifting or deviation is impossible because the telescopic members are holding and guiding the block in its path. It is to be understood that the telescopic members function as any conventional pneumatic-actuated telescopic assembly. A reservoir tank 31 may be provided.

By again actuating the valve 30 in the opposite direction the compressed air from the telescopic members 8 is allowed to escape. At the same time air flows into the cylinders 33. Inside the cylinders 33 are pistons having connecting rods 34.

Connecting to the rods 34 are the pull-cables which are fixed to the block 1. This will cause the block to be raised to the position as is shown in Fig. 1 by the pulling on the cable and to maintain the block in a raised position in conjunction with spring strip 17.

It is to be noted that most heavy vehicles are equipped with a complete pneumatic system.

The telescopic members include elements 8, 8′ and 8″, which are slidable relative to each other, it being noted that the elements 8′ and 8″ function as pistons when extended by air. Of course, suitable stops, not shown, of conventional nature, limit the outward path of movement of the elements.

It is also possible to use the invention with a lead vehicle 27 (Fig. 4) having one or more trailers 28 connected thereto. In this case the vehicle and each trailer are provided with a device of the invention, but a single operating element is accessible to the operator of the lead vehicle for operating all of the devices. The manually operable device accessible to the operator for operating the structure of the invention may take the form of a hand-operated valve or an electro-pneumatic valve, such valves controlling the flow of fluid through a conduit means which may include flexible hoses or the like leading to the telescopic means.

From the tank 32 fluid, such as air under pressure, is supplied to the lines 11, 12 of both vehicles as well as to the cylinders 33 thereof. The piston in each of these cylinders is connected to cable 14. When the operator directs air under pressure to the telescopic means 8, air escapes through a suitable valve from cylinder 33 and the cable 14 maintains the block in its proper location while it moves to its operative position. Air under pressure is supplied to cylinder 33 to shift the piston therein for pulling cable 14 to return the block to its rest position, and at this time the air under pressure is released from conduit 11.

The device of the invention is particularly advantageous when used with tow trucks since such vehicles must overcome particularly large resistance during pulling of an automobile or the like out of a relatively low position. In such cases the tow vehicle requires a particularly reliable device to prevent rolling of the tow vehicle, and the device of the invention meets this requirement.

Thus, it will be seen that a device for preventing rolling of a vehicle has been provided and this device includes a stop or brake block which has an operative position between a selected vehicle wheel and the surface which carries the wheel and a rest position distant from said wheel and raised from the previously engaged ground surface.

The device includes support means located adjacent the block when the latter is receded into its rest position; furthermore, hollow expansible and collapsible telescopic means are connected to said support means to move and guide the block to its operative position during expansion of compressed air or like medium and to its rest position during collapsing of said telescopic means and under the action of pulling cable means operated and controlled by pneumatic means. Special conduit means communicate with the interior of the uppermost cylinder-shaped part of telescopic means for supplying fluid under pressure to piston-shaped parts of said telescopic means for expanding the latter.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A device for use in connection with a vehicle during parking thereof to prevent undesired rolling of same; comprising a housing having an open bottom and adapted to be attached to said vehicle, a block movable out and into said housing from an operative position to a rest position, said block when moved to operative position being located between a wheel of the vehicle and a location of contact of said wheel with the surface carrying the vehicle, said block when in said rest position being distant from the wheel and raised from the surface, said block extending completely in said housing during said rest position and being provided with a bottom wall constructed for closing the open bottom of said housing in said rest position, said block including a side wall concave in shape, said block being wider at the bottom than at the top thereof, an arcuate resilient strip fixed in said housing and engaging said side wall of said block when the latter is in said rest position thereby to retain the block in said latter position, expansible and collapsible pneumatically operated telescopic means supported in said housing and extending angularly and downwardly toward the wheel of the vehicle, said telescopic means carrying said block and guiding the latter in a substantially straight and unidirectional path to said operative position during expansion of said telescopic means and to said rest position during collapsing of said telescopic means, conduit means communicating with the interior of said telescopic means and including means for supplying air under pressure to expand said telescopic means and thereby to guide said block through said open bottom of said housing out of the latter to its operative position, a pull cable connected to said block, and pneumatic means operatively connected to said pull cable for moving the latter with said block from its operative position to its rest position in said housing, whereby collapse of said telescopic means is simultaneously effectuated.

2. A device according to claim 1, said bottom wall of said block being provided with pointed projections extending downwardly therefrom to prevent displacement of said block with respect to its location of contact with said surface, when said block is in its operative position.

References Cited in the file of this patent

UNITED STATES PATENTS

| | | |
|---|---|---|
| 1,310,209 | Ostolaza | July 15, 1919 |
| 2,182,044 | Ackerman | Dec. 5, 1939 |
| 2,693,252 | Bert | Nov. 2, 1954 |
| 2,789,665 | Wright | Apr. 26, 1957 |

FOREIGN PATENTS

| | | |
|---|---|---|
| 1,111,303 | France | Oct. 26, 1955 |